US008793028B2

(12) United States Patent
Jain et al.

(10) Patent No.: US 8,793,028 B2
(45) Date of Patent: Jul. 29, 2014

(54) SYSTEM AND METHOD FOR DETERMINING POTENTIAL POWER OF INVERTERS DURING CURTAILMENT MODE

(75) Inventors: Palak Jain, Las Cruces, NM (US); Owen Jannis Schelenz, Schenectady, NY (US); Kathleen Ann O'Brien, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 381 days.

(21) Appl. No.: 13/300,898

(22) Filed: Nov. 21, 2011

(65) Prior Publication Data
US 2013/0131884 A1 May 23, 2013

(51) Int. Cl.
G06F 19/00 (2011.01)
H02J 3/38 (2006.01)

(52) U.S. Cl.
CPC ............. *H02J 3/383* (2013.01); *Y02E 10/563* (2013.01)
USPC ............................................ 700/297; 307/31

(58) Field of Classification Search
CPC ............. H02J 3/383; H02J 3/386; H02J 3/40; H02J 3/385; H01L 31/042
USPC ............................................ 700/297; 307/31
See application file for complete search history.

(56) References Cited

U.S. PATENT DOCUMENTS

| 8,352,091 B2* | 1/2013 | Haugh | 700/286 |
| 8,390,147 B2* | 3/2013 | Stauth et al. | 307/77 |
| 8,629,658 B1* | 1/2014 | Celani | 320/140 |
| 2008/0238195 A1* | 10/2008 | Shaver et al. | 307/18 |
| 2010/0213761 A1* | 8/2010 | McDonald et al. | 307/18 |
| 2010/0289337 A1* | 11/2010 | Stauth et al. | 307/77 |
| 2010/0295383 A1* | 11/2010 | Cummings | 307/151 |
| 2010/0308662 A1* | 12/2010 | Schatz et al. | 307/80 |
| 2011/0227411 A1* | 9/2011 | Arditi | 307/18 |
| 2012/0049635 A1* | 3/2012 | Schelenz et al. | 307/82 |
| 2012/0193990 A1* | 8/2012 | Nimni et al. | 307/84 |

(Continued)

FOREIGN PATENT DOCUMENTS

WO WO2010136968 A1 12/2010

OTHER PUBLICATIONS

Gu, Herong; Yang, Zilong; Wang, Deyu; Wu, Weiyang, "Research on control method of double-mode inverter with grid-connection and stand-alone", Conference Proceedings—IPEMC 2006: CES/IEEE 5th International Power Electronics and Motion Control Conference, v1, p. 473-477, 2007, Aug. 14, 2006 - Aug. 16, 2006; ISBN-10: 1424404487, ISBN-13: 9781424404483.

*Primary Examiner* — Michael D Masinick
(74) *Attorney, Agent, or Firm* — Paul J. DiConza

(57) ABSTRACT

A power inverter system includes a plurality of power inverters such as solar inverters receiving power from at least one energy source. Each power inverter includes algorithmic maximum peak power tracking (MPPT) software or integrated MPPT firmware to calculate its own potential real power. A controller is in electrical communication with selected power inverters that are operating in curtailed modes of operation and commands each selected power inverter to shift its power production duties and to perform MPPT sweeps. Each selected power inverter then calculates its own potential real power capability in response to corresponding MPPT sweep data. The potential real power capability information is received by the controller that transmits the information to a power utility allowing the power utility to more efficiently utilize real and reactive power available by the plurality of power inverters

14 Claims, 2 Drawing Sheets

(56) References Cited

U.S. PATENT DOCUMENTS

Figure 1:
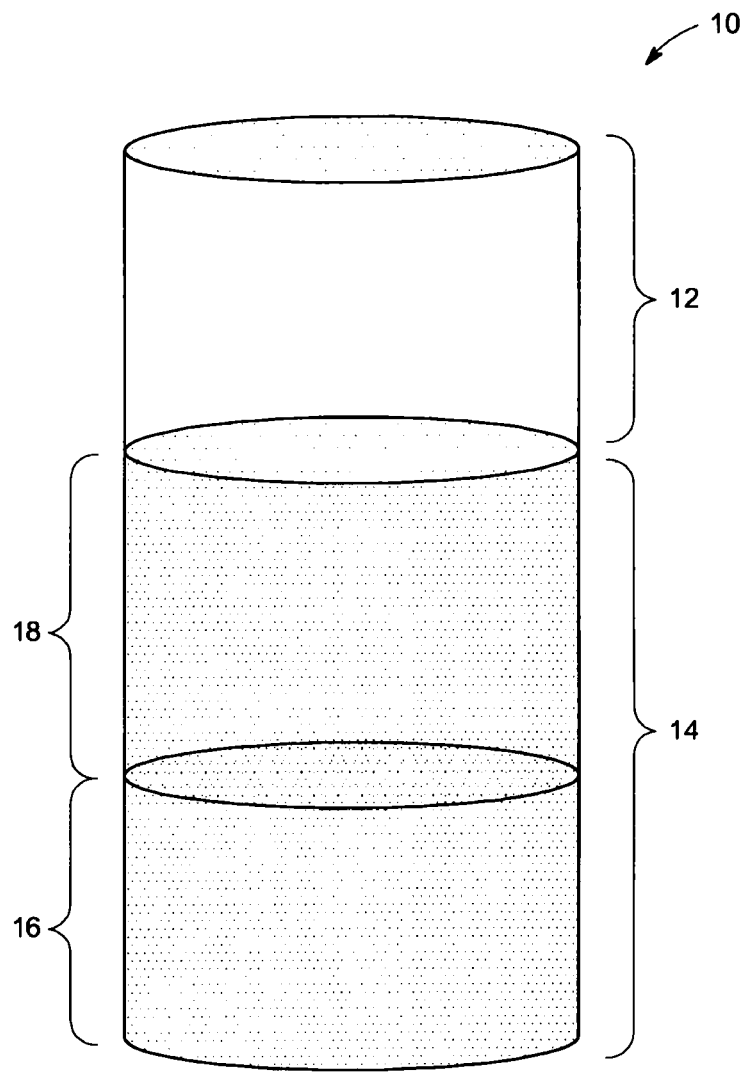

| | | | |
|---|---|---|---|
| 2012/0223583 A1* | 9/2012 | Cooley et al. | 307/82 |
| 2012/0274139 A1* | 11/2012 | Agamy et al. | 307/71 |
| 2012/0310436 A1* | 12/2012 | Kjaer | 700/297 |
| 2012/0319489 A1* | 12/2012 | McCaslin et al. | 307/77 |
| 2013/0057069 A1* | 3/2013 | Meredith-Jones et al. | 307/43 |

* cited by examiner

US 8,793,028 B2

SYSTEM AND METHOD FOR DETERMINING POTENTIAL POWER OF INVERTERS DURING CURTAILMENT MODE

BACKGROUND

The subject matter of this disclosure generally relates to renewable energy sources, and more particularly, to systems and methods for determining the potential power capability of power inverters, including but limited to, solar inverters when operating in a curtailment mode.

Solar power generation systems are generally categorized as renewable variable power generation systems because the energy is harvested from naturally occurring and plentiful sources of energy. However, the amount of power produced by such systems may be unstable. The power generated by a solar farm for example, may vary as a function of cloud coverage and the position of the sun in the sky. Such a solar farm may have a plurality of energy harvesting panels with associated photovoltaic cells and inverters that may require power monitoring and control for coordinating and providing power to an electrical grid. For example, a utility may monitor the grid power demand and may need to communicate with the solar farm to determine if the solar farm has the capacity to meet some or all of the power demand.

It is common to connect many small solar inverters to the electrical grid, making the collection of inverters appear as one power plant. Electrical power grids generally require both a source of active power and a source of reactive power. Active power (Watts) is generally provided to the electrical grid based upon the capacity of each power generation system inverter. Active power or real power is any power that is converted from a renewable energy source, such as solar or wind, into power that performs work. Obviously, a plant's maximum available active power capability is its output at any given time. Reactive power (VARs) is generally proportioned among the inverters based upon the number of inverters in the power generation system. Reactive power relates to any inverter capacity that is not being used to convert real power, regardless of whether a plant is curtailed or not. Further, reactive power capacity is available day or night and is not dependent on a renewable energy source, such as wind or solar to be present.

Power electronics used in the conversion of renewable energy into a suitable energy for the power grid can behave as an active power source, a reactive power source, or a combination of both. The inverter is limited by the capacity of the power electronics and the renewable energy available at that particular time.

Further, solar inverters are sometimes required to operate in a curtailment mode. Curtailed as used herein means the output is intentionally reduced, by either shutting some inverters down or running all inverters at a reduced rate; a utility operator does not know what the plant's full output capability might be. When a solar inverter is operating in curtailed mode, for example, a utility is not able to determine the power capability of the solar inverter, which may change with time due to many factors such as described herein. Information regarding potential real and reactive power produced by solar inverters is very useful to utilities since this information allows utilities more flexibility to command inverters to more efficiently utilize their respective power output.

In view of the foregoing, there is a need for a solar power inverter system and method of operation that allows power utilities more flexibility in determining the actual potential power capability of solar inverters during curtailed modes of operation.

BRIEF DESCRIPTION

One embodiment of the present disclosure is directed to a method of operating a solar power inverter system, the method comprising:

providing a plurality of power inverters receiving power from at least one energy source, each power inverter comprising algorithmic maximum peak power tracking (MPPT) software or integrated MPPT firmware, and further providing a controller;

operating one or more of the power inverters in a curtailed mode;

selecting via the controller, one or more power inverters that are operating in curtailed modes of operation;

commanding via the controller, the selected power inverters to shift power production duties and to perform MPPT sweeps;

calculating via the algorithmic MPPT software or integrated MPPT firmware, the potential real power capability of each selected power inverter in response to corresponding MPPT sweep data;

transmitting the potential real power capability of selected individual power inverters or an aggregate of selected power inverters to the controller, and storing the potential real power capability information therein; and transmitting the potential real power capability information received by the controller to a power utility allowing the power utility to more efficiently utilize real and reactive solar power available by the plurality of power inverters.

Another embodiment of the present disclosure is directed to a power inverter system, comprising:

a plurality of power inverters receiving power from at least one energy source, each inverter configured via algorithmic maximum peak power tracking (MPPT) software or integrated MPPT firmware to calculate its own potential real power; and a controller in electrical communication with selected power inverters that are operating in curtailed modes of operation and shifting power production duties and performing MPPT sweeps in response to controller commands, such that each selected power inverter calculates via the algorithmic MPPT software or integrated MPPT firmware its own potential real power capability in response to corresponding MPPT sweep data.

DRAWINGS

Figure 2:
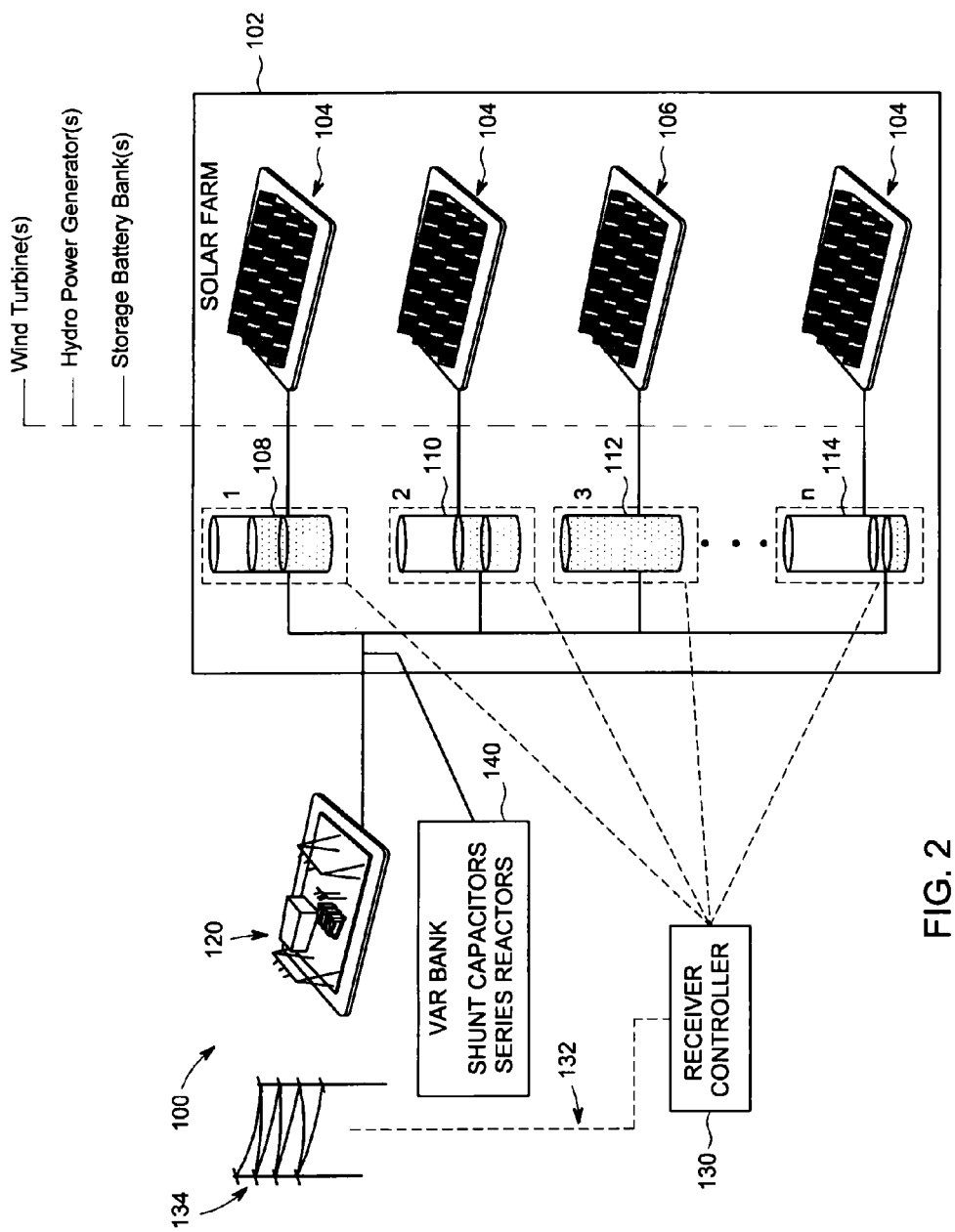

These and other features, aspects, and advantages of the present invention will become better understood when the following detailed description is read with reference to the accompanying drawing, wherein:

FIG. 1 illustrates the capacity of a power inverter to support active power and reactive power according to one embodiment; and FIG. 2 illustrates a solar farm configured to support active power and reactive power according to one embodiment.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

FIG. 1 illustrates the capacity of a power inverter (10) to support active power (Watts) and reactive power (VARS)

according to one embodiment. Power inverter 10 may be part of a solar, wind, battery or hydro power generation system. Assuming power inverter 10 provides power to an electrical grid based on solar power, it can be seen that power inverter 10 has a total power capacity that comprises a reactive power capacity 12 and an active power capacity 14. Power inverter 10 may operate in a curtailed mode of operation as stated herein, in which it generates real or active power 16 that is even less than its true active power capacity 14. Solar inverters are sometimes required to operate in a curtailment mode as also stated herein. Curtailed as used herein means the output is intentionally reduced, by either shutting some inverters down or running all inverters at a reduced rate. A utility operator generally does not know what the plant's full output capability might be. When a solar inverter is operating in curtailed mode, for example, a utility is not able to determine the power capability of the solar inverter, which may change with time due to many factors such as described herein. Information regarding potential real and reactive power produced by solar inverters is very useful to utilities since this information allows utilities more flexibility to command inverters to more efficiently utilize their respective power output.

FIG. 2 illustrates power inverter system 100 comprising a solar farm 102 configured to generate active power and reactive power according to one embodiment. Solar farm 102 comprises a plurality of solar power inverters 108, 110, 112, 114. Power inverters 108, 110 and 114 are each providing active power to an electrical power grid 120 based upon available power generated via corresponding power sources (solar panels) 104. Assuming power inverters 108, 110 and 114 are each operating in a curtailed mode and are thus generating active output power 16 that is less than its respective true real power generation capacity 14, each power inverter retains a reserve capacity 18 to provide active power to the electrical power grid 120.

Although the embodied power inverter system 100 is described herein with reference to a solar farm 102, solar power inverters 108, 110, 112, 114 and solar panels 104, 106, other power inverter system embodiments using wind, battery and/or hydro power elements can just as easily be implemented in accordance with the principles described herein. Solar farm 102 for example, may comprise a wind farm, a hydro farm, and/or a battery farm. Solar power inverters 108, 110, 112, 114 may just as easily comprise wind power inverters, battery power inverters, and/or hydro power inverters. Solar panels 104, 106 may just as easily comprise wind turbines, batteries, and/or hydro plants/turbines.

According to one embodiment, power inverter 112 is providing its true maximum active power 14 to the electrical power grid 134 since it is not being curtailed. Since the true active power 14 of power inverter 112 usurps its entire power generation capacity, power inverter 112 also has no power capacity reserve to generate VAR power to the electrical grid 134.

Power inverter system 100 can also be seen to comprise a central controller 130. Controller 130 continuously polls the plurality of power inverters 108, 110, 112, 114 to determine the present real power capacity of each power inverter. According to one embodiment, the calculation of potential real power is performed by each inverter 108-114. Potential reactive power produced by an inverter is then obtained simply by subtracting the rated real power 14 of the inverters 108-114 from the power obtained by maximum peak power tracking (MPPT) sweeping.

The desired MPPT sweeping can be performed either by each inverter or by only a few selected inverters as stated herein. When MPPT sweeping is carried out by a few selected inverters, the energy yield will advantageously increase which would otherwise be lost during sweeping of all inverters individually.

Determining a plant's actual capacity when curtailed can provide a variety of benefits, as stated herein. Further, a plant's capacity can be determined using calculations, testing methods, or a combination of calculations and testing methods. The total available plant power can be tested for example, by continuously shifting power production duties to different inverters in the plant, ramping each inverter up to its maximum output at that time, and ramping others down accordingly to maintain constant curtailment. During the latter case, the total available power would be the addition of every inverter's last recorded maximum power capacity. When available, both methods can be employed to combine inverter output information to provide a coherent maximum available power status.

A point of consideration relates to accuracy of calculations since PV panels may be cooler if maximum power has not been extracted from them for some time and therefore may demonstrate a brief power overproduction until the panels heat up. This brief overproduction can be accounted for in the short term, but not necessarily in the long term.

The central controller 130 can communicate with individual inverters 108-114 and retrieve information about potential real and reactive power and thus determine the aggregate power. Conversely, these inverters 108-114 can each determine the aggregate of potential real and reactive power produced by the inverters by communicating with neighboring inverters. Any one of the inverters 108-114 can then communicate the aggregate potential real and reactive power information to the central controller 130. The central controller 130 transmits the aggregate power information to a corresponding utility 120 via the power grid 134 in real time, even when the inverters 108-114 are curtailing power.

Upon receipt of a power command via a power grid feedback link 132, the controller 130 proceeds to request power support from power inverters 108, 110, 114 with sufficient capacity to support generation of the requested power. Since power inverter 112 is already generating power at its maximum capacity, power inverter 112 is not requested to provide VAR power. VAR power may instead be requested only from power inverters 108, 110 and 114 that have VAR power capacity. According to one embodiment, VAR power is requested from power inverters 108, 110 and 114 in proportion to the amount of VAR power capacity available from each power inverter. Thus, for example, if power inverter 110 has twice the VAR capacity available as that available from power inverter 108, then power inverter 110 is requested to supply twice the VAR power as that requested from power inverter 108. This method of operation ensures that power inverters with higher real power production do not become curtailed due to the assumption that VAR power requests should be shared equally among the plurality of power inverters 108, 110, 112 and 114 operating in response to the central controller 130.

Although power inverter system 100 comprises a central controller 130, other embodiments may comprise a distributed control architecture using the principles described herein. A distributed control architecture may, for example, employ a control structure that is distributed about each inverter such that communications are accomplished via a mesh or neural type network. A distributed control structure provides advantages over a centralized control structure in that failure of a central controller results in overall system failure; whereas failure of a single inverter controller in a distributed control structure does not adversely impact the operation of the inverters still operating under localized control in the distributed control structure.

In summary explanation, one embodiment of a solar power inverter system 100 comprises a plurality of solar power inverters 108-114 receiving power from at least one solar energy source 104, 106, each inverter 108-114 configured via algorithmic MPPT software or integrated MPPT firmware to calculate its own potential real power. The solar power inverter system 100 further comprises at least one controller 130 controlling selected solar power inverters that are operating in curtailed modes of operation to perform MPPT sweeps, such that each selected power inverter calculates via the algorithmic software or integrated firmware its own potential real power capability in response to corresponding MPPT sweep data.

More specifically, the solar power inverter controller 130 selects one or more solar power inverters that are presently curtailing their output power. The controller 130 then transmits commands to the selected solar power inverters, causing the selected solar power inverters to shift power production duties and to perform MPPT sweeps. Upon receipt of the MPPT sweep commands, each selected inverter also calculates via algorithmic MPPT software and/or integrated MPPT firmware, its potential active power capability based upon the corresponding MPPT sweep data. This potential active power capability of the selected individual solar power inverters or an aggregate potential power capability of the selected solar power inverters is transmitted to the solar power inverter controller 130 where the information is stored. The potential power capability information received by the solar power inverter controller is then transmitted to a power utility 120 via any suitable method of communication, such as without limitation, wired, wireless, analog, digital, and fiber optic, allowing the power utility 120 to more efficiently utilize active and reactive solar power available by the plurality of solar power inverters 108-114. According to one embodiment, the information is utilized in integrated volt var control (IVVC) optimization algorithms for providing set points to control devices such as capacitor banks 140 and voltage regulators 140 for assisting the optimal dispatch of distributed energy resources and other assets.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating a power inverter system, the method comprising:
   providing a plurality of power inverters receiving power from at least one energy source, each power inverter comprising algorithmic maximum peak power tracking (MPPT) software or integrated MPPT firmware, and further providing a controller;
   operating one or more of the power inverters in a curtailed mode;
   selecting via the controller, one or more power inverters that are operating in curtailed modes of operation;
   commanding via the controller, the selected power inverters to change power production duties and to perform MPPT sweeps;
   calculating via the algorithmic MPPT software or integrated MPPT firmware, the potential real power capability of each selected power inverter in response to corresponding MPPT sweep data;
   transmitting the potential real power capability of selected individual power inverters or an aggregate of selected power inverters to the controller, and storing the potential real power capability information therein; and
   transmitting the potential real power capability information received by the controller to a power utility allowing the power utility to more efficiently utilize real and reactive solar power available by the plurality of power inverters, wherein calculating via the algorithmic MPPT software or integrated MPPT firmware, the potential real power capability of each selected power inverter in response to corresponding MPPT sweep data, comprises:
   continuously shifting power production duties to selected inverters;
   ramping power production of each selected inverter up to its maximum output while ramping power production of other inverters down to maintain a constant curtailment;
   measuring the maximum power capacity of each selected inverter during its maximum output; and
   calculating the potential real power capability of each selected power inverter based on its last recorded maximum power capacity.

2. The method of operating the power inverter system according to claim 1, wherein the plurality of power inverters comprises solar inverters.

3. The method of operating the power inverter system according to claim 1, wherein the plurality of power inverters are selected from wind power system inverters, hydro power system inverters, and battery system power inverters.

4. The method of operating the power inverter system according to claim 1, wherein providing a plurality of power inverters receiving power from at least one energy source comprises providing a plurality of solar power inverters receiving power from one or more solar panels.

5. The method of operating the power inverter system according to claim 1, wherein providing a plurality of power inverters receiving power from at least one energy source comprises providing a plurality of power inverters receiving power from one or more wind turbines.

6. The method of operating the power inverter system according to claim 1, wherein providing a plurality of power inverters receiving power from at least one energy source comprises providing a plurality of hydro power inverters receiving power from one or more hydro power generators.

7. The method of operating the power inverter system according to claim 1, wherein providing a plurality of power inverters receiving power from at least one energy source comprises providing a plurality of power inverters receiving power from one or more batteries.

8. A method of operating a power inverter system, the method comprising:
   providing a plurality of power inverters receiving power from at least one energy source, each power inverter comprising algorithmic maximum peak power tracking (MPPT) software or integrated MPPT firmware, and further providing a controller;
   operating one or more of the power inverters in a curtailed mode;
   selecting via the controller, one or more power inverters that are operating in curtailed modes of operation;
   commanding via the controller, the selected power inverters to change power production duties and to perform MPPT sweeps;
   calculating via the algorithmic MPPT software or integrated MPPT firmware, the potential real power capability of each selected power inverter in response to corresponding MPPT sweep data;

transmitting the potential real power capability of selected individual power inverters or an aggregate of selected power inverters to the controller, and storing the potential real power capability information therein; and transmitting the potential real power capability information received by the controller to a power utility allowing the power utility to more efficiently utilize real and reactive solar power available by the plurality of power inverters, wherein calculating via the algorithmic MPPT software or integrated MPPT firmware, the potential real power capability of each selected power inverter in response to corresponding MPPT sweep data, comprises:

providing an analytic model for each power inverter;

calculating available real power for each selected power inverter based on its analytic model and corresponding input information selected from solar information, wind information, hydro information, stored power information, and combinations thereof;

continuously shifting power production duties to selected inverters;

ramping power production of each selected inverter up to its maximum output while ramping power production of other inverters down to maintain a constant curtailment;

measuring the maximum power capacity of each selected inverter during its maximum output;

calculating the potential real power capability of each selected power inverter based on its last recorded maximum power capacity; and calculating a coherent maximum real power for each selected power inverter based on both its last recorded maximum power capacity and its analytic model and corresponding ambient input information.

9. A method of operating a power inverter system, the method comprising:

providing a plurality of power inverters receiving power from at least one energy source, each power inverter comprising algorithmic maximum peak power tracking (MPPT) software or integrated MPPT firmware, and further providing a controller;

operating one or more of the power inverters in a curtailed mode;

selecting via the controller, one or more power inverters that are operating in curtailed modes of operation;

commanding via the controller, the selected power inverters to change power production duties and to perform MPPT sweeps;

calculating via the algorithmic MPPT software or integrated MPPT firmware, the potential real power capability of each selected power inverter in response to corresponding MPPT sweep data;

transmitting the potential real power capability of selected individual power inverters or an aggregate of selected power inverters to the controller, and storing the potential real power capability information therein;

transmitting the potential real power capability information received by the controller to a power utility allowing the power utility to more efficiently utilize real and reactive solar power available by the plurality of power inverters;

calculating via the algorithmic MPPT software or integrated MPPT firmware, the potential reactive power capability of each selected power inverter in response to corresponding MPPT sweep data;

transmitting the potential reactive power capability of selected individual power inverters or an aggregate of selected power inverters to the controller, and storing the potential reactive power capability information therein; and transmitting the potential reactive power capability information received by the controller to a power utility allowing the power utility to more efficiently utilize real and reactive solar power available by the plurality of power inverters.

10. A power inverter system, comprising:

a plurality of power inverters receiving power from at least one energy source, each inverter configured via algorithmic maximum peak power tracking (MPPT) software or integrated MPPT firmware to calculate its own potential real power; and a controller in electrical communication with selected power inverters that are operating in curtailed modes of operation and shifting power production duties and performing MPPT sweeps in response to controller commands, such that each selected power inverter calculates via the algorithmic MPPT software or integrated MPPT firmware its own potential real power capability in response to corresponding MPPT sweep data, wherein the controller continuously shifts power production duties to selected inverters and ramps power production of each selected inverter up to its maximum output while ramping power production of other inverters down to maintain a constant curtailment, and further wherein each selected inverter measures its maximum power capacity during its maximum output and calculates its potential real power capability based on its last recorded maximum power capacity.

11. The power inverter system according to claim 10, wherein the controller comprises algorithmic software or integrated firmware enabling it to generate power inverter real power support commands in response to information received from a power grid based upon potential power capability information associated with the selected power inverters.

12. The power inverter system according to claim 10, wherein at least one energy source is selected from solar panels, wind turbines, batteries, and hydro power generators.

13. The power inverter system according to claim 10, wherein the plurality of power inverters comprises solar power inverters.

14. The power inverter system according to claim 10, wherein the plurality of power inverters are selected from wind power system inverters, hydro power system inverters, and battery system power inverters.

* * * * *